Nov. 22, 1960     J. A. KUECKEN     2,961,659
SIGNAL PROCESSING ARRANGEMENT HAVING SEPTUM DIVIDED HORN
Filed June 12, 1957
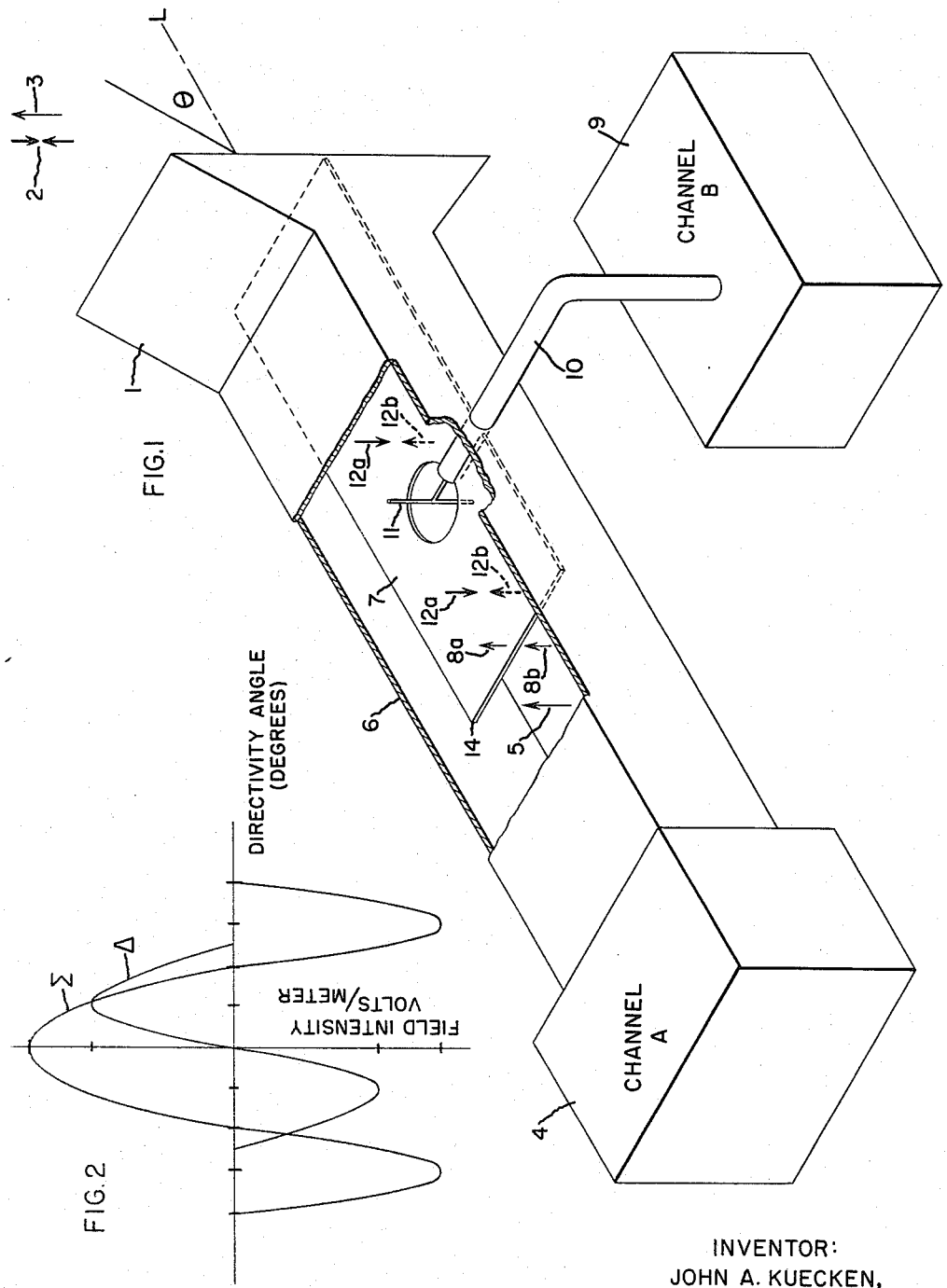
INVENTOR:
JOHN A. KUECKEN,
BY Michael Masnik
HIS ATTORNEY.

ing a directivity pattern formed by the super position of two distinct electromagnetic modes, as for example shown at 2 and 3. The dotted line vectors shown at 2 represent the electric field configuration corresponding to one of the modes, for example $TE_{10}$, and the solid line vector 3 corresponds to the electric field configuration of the other mode. It should be noted that the vectors 2 consist of E field components which are in phase opposition and thus represent a pattern possessed of odd symmetry. Vector 3 represents a directivity pattern possessed of even symmetry. This terminology will be explained in further detail later. In order to derive the two different directivity patterns there is provided a source of electromagnetic waves 4 which are adapted to be coupled in a mode represented by vector 5 into the waveguide arm 6. In the waveguide feed 6 there is provided a septum 7 in the form of a metallic plate or sheet which divides a portion of the waveguide into two separate portions extending from a predetermined point within the waveguide 6 out to the exit of the horn 1 which is coupled to one end of the waveguide 6. The electromagnetic waves of the mode shown by vector 5 are divided by septum 7 into two equal in-phase components 8a and 8b. These equal components are propagated through the respective divided portions of the waveguide and recombined at the exit of the horn 1 to yield the desired directivity of the mode represented by vector 3. A further source of electromagnetic waves 9 is provided which couples electromagnetic waves over the coaxial transmission line 10 and a capacitive probe 11 into the waveguide 6. The probe is positioned to lie in an opening which is shown to be circular in the metallic septum 7. Upon being energized from source 9, probe 11 launches electromagnetic wave components 12a and 12b into the upper and lower divided waveguide sections which are in phase opposition. These waves of equal intensity but of phase opposition are propagated in both directions along the divided upper and lower portions of the waveguide 6. These wave components, 12a and 12b, exit from the horn 1 in a directivity pattern represented by the electric field vectors 2. It should be noted that a portion of the waves launched by probe 11 are propagated along the divided portion of the waveguide in a direction opposite to that from the horn. In the waveguide, the existence of the phase opposed field patterns is dependent upon the existence of the conductive septum. Upon reaching the end 14 of the septum 7, these waves are reflected by the effective open circuit created by the end 14 of the septum. The waveguide dimensioning between the probe 11 and the end of the septum 14 is such that the waves, upon being reflected on the effective open circuit, appear back at the probe 11 in a phase such as to reinforce the waves being communicated towards horn 1.

The result of providing the vectors represented at 2 and 3 is more graphically illustrated in Fig. 2 wherein the field intensity in volts per meter is plotted as ordinate and the directivity angle in degrees with respect to the septum plane is plotted as abscissa. It should be noted that the out-of-phase wave components 2 create the odd symmetry directivity pattern shown as delta and the in-phase vector component 3 generates the even symmetry pattern shown as sigma. These are the requisite directivity patterns for providing direction finding. It should be noted that the directivity patterns were achieved without resorting to complicated waveguide junctions and constructions and the existence of the phase opposed mode is dependent only upon the geometry of the arrangement and not on frequency. Thus, any frequency of wave which can be propagated along the divided portion of the waveguide will produce a directivity pattern of odd symmetry.

It can be shown that the arrangement follows the theorem of reciprocity in that directivity patterns for re-

2,961,659
SIGNAL PROCESSING ARRANGEMENT HAVING SEPTUM DIVIDED HORN

John A. Kuecken, Syracuse, N.Y., assignor to General Electric Company, a corporation of New York Filed June 12, 1957, Ser. No. 665,318

5 Claims. (Cl. 343—778)

This invention relates primarily to signal processing arrangements and particularly to an arrangement for providing predetermined directivity patterns of electromagnetic waves for use in the transmission and/or reception of electromagnetic waves.

In the field of electrical signal processing it is sometimes desirable to establish directivity patterns of predetermined symmetry for purposes of facilitating the processing of signals. For example, in the field of direction finding it is oftentimes desirable to determine the direction from which electromagnetic waves are being received. Directivity patterns possessed of both even and odd symmetry are used for deriving such position information. Unfortunately, arrangements for providing such desired symmetry have been expensive, complicated and unusually bulky. For example, in radar type object detectors of the pulse echo type, resort is oftentimes made to such complex waveguide configurations as magic tees, hybrid junctions, etc.

It is therefore an object of my invention to provide an improved signal processing arrangement.

It is another object of my invention to provide an improved arrangement and method for providing desired directivity patterns.

A further object of my invention is to provide an improved method and apparatus for providing directivity patterns of odd and even symmetry.

A further object of my invention is to provide an improved direction finding arrangement.

In accordance with one embodiment of my invention applicable to direction finding, a novel waveguide arrangement comprising a septum and waveguide feed is employed to establish directivity patterns of desired configuration. The relatively simple arrangements avoid the shortcomings of the prior art waveguide constructions.

The features of the present invention which are believed to be novel are particularly pointed out in the appended claims. In the drawings, Fig. 1 shows in block diagram form an arrangement embodying the invention for determining the direction from which electromagnetic waves are being received. Fig. 2 illustrates graphically certain waveforms useful in explaining the features of the present invention.

Referring to Fig. 1 there is shown one embodiment of the present invention applicable to detecting the angular direction, $\theta$, from which electromagnetic waves are being received from a remote object in space with respect to the given elevation reference line L.

Referring to Fig. 1 there is shown an arrangement in accordance with the present invention for generating electromagnetic waves in a directivity pattern which has an even and an odd symmetry. This type of directivity pattern is oftentimes useful in the art of direction finding. The directivity pattern characteristic permits a method for measuring the angle arrival of the incoming wave. For purposes of initial simplicity, this amounts to saying that it is desired to provide electromagnetic waves at the exit of an antenna or electromagnetic waveguide horn 1 havception and for transmission are identical. Thus, radiant energy received at an angle theta from remote source with respect to the elevation reference line L is picked up in the two directivity patterns. The channel 9, corresponding to the odd symmetry pattern, provides an output which over a limited range of angles provides a voltage proportional to angle theta. This is shown by the characteristic curve delta of Fig. 2. Channel 4, on the other hand, corresponding to the even symmetry directivity pattern, provides an output as shown by the curve sigma of Fig. 2.

The in-phase vectors 8a and 8b induce equal and opposite charges on capacitive probe 11 such that the channel B is effectively insensitive or is unable to detect or receive the signals corresponding to the vectors 8a and 8b.

Incident waves received from the remote source can be looked upon as providing wave components in the waveguide portions defined by the septum which correspond to the even and odd modes previously described. Thus, the capacitive probe 11 detects only the odd mode components and rejects the even mode components, whereas the channel 4 detects or sees only the even mode components and rejects the others. The channel 4 is protected from the odd mode components by the effective open circuit provided at the terminus 14 of the septum 7.

In conclusion, it should be noted that under certain circumstances channels A and B may comprise the same or different sources. For reception purposes channel B may comprise an indicator for utilizing the amplitude versus elevation angle information shown in Fig. 2 to indicate the distance off axis of remote signals source or object of the angle theta or a voltage generated which can be used to correct a position of the antenna and reduce the elevation angle to zero. The channel A, when used for reception, can provide an output signal useful to indicate the presence of a detective object or signal from a remote source and in addition provide a reference signal for use in channel B to derive the desired elevation angle information.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a source of first waves, a source of second waves, a first waveguide, means for propagating said first waves in said first waveguide in the dominant mode thereof, a second waveguide comprising a horn at one end, a conductive septum dividing said second waveguide into two waveguide portions, means for propagating said first waves into both of said second waveguide portions in the dominant mode thereof and in the same phase comprising means for coupling said first guide to the other end of said second guide, and means for coupling said second waves into both of said waveguide portions in the dominant mode thereof but in phase opposition comprising a capacitive probe positioned within a slot in said septum.

2. In combination, a source of first waves, a source of second waves, a first rectangular waveguide, means for propagating said first waves in said first guide in the dominant mode thereof, a second rectangular waveguide comprising a horn portion at one end, a conductive septum dividing said second waveguide into two equal waveguide portions, means for propagating said first waves in both portions of said second waveguide in the same phase and in the dominant mode thereof comprising means for coupling said first guide to the other end of said second guide, means for propagating said second waves in both portions of said second guide in the dominant mode thereof but in phase opposition comprising a capacitive probe positioned within a slot in said septum and electrically dimensioned to be sensitive only to waves of phase opposition appearing in both of said second waveguide portions, and coaxial waveguide means for coupling said capacitive probe to said second source of waves.

3. In combination, a source of first waves, a source of second waves, a first rectangular waveguide, means for propagating said first waves in said first guide in the dominant mode thereof, a second rectangular waveguide comprising a load circuit at one end, a conductive septum dividing said second waveguide into two waveguide portions, means for propagating said first waves in both portions of said second waveguide in the same phase and in the dominant mode thereof comprising means for coupling said first guide to the other end of said second guide, means for propagating said second waves in both portions of said second guide in the dominant mode thereof but in-phase opposition comprising a dipole positioned within a slot in said septum and having a respective one of its dipoles extending into a respective divided portion of said second guide, and means for coupling said dipole to said second source of waves.

4. In combination, a first circuit, a second circuit, a first rectangular waveguide, a second rectangular waveguide comprising a load circuit at one end, a conductive septum dividing said second waveguide into two waveguide portions, means for coupling said first guide to the other end of said second guide, a dipole positioned within a slot in said septum and having a respective one of its dipoles extending into a respective divided portion of said second guide, and means for coupling said dipole to said second circuit.

5. In combination, a first circuit, a second circuit, a first waveguide, a second waveguide comprising a load circuit at one end, a conductive septum dividing said second waveguide into two waveguide portions, means for coupling said first guide to the other end of said second guide, a dipole positioned within a slot in said septum and having a respective one of its dipoles extending into a respective divided portion of said second guide, and means coupling said dipole to said second circuit.

References Cited in the file of this patent

UNITED STATES PATENTS

| 2,691,731 | Miller | Oct. 12, 1954 |
| 2,759,154 | Smith et al. | Aug. 14, 1956 |
| 2,825,060 | Ruze | Feb. 15, 1958 |

OTHER REFERENCES

"Dual Mode Horn Feed for Microwave Multiplexing," Electronics, September 1954, pp. 162–164.